(12) United States Patent
Altman et al.

(10) Patent No.: US 10,941,070 B2
(45) Date of Patent: Mar. 9, 2021

(54) METHODS AND APPARATUS FOR CUTTING RADII IN FLEXIBLE THIN GLASS

(71) Applicant: Corning Incorporated, Corning, NY (US)

(72) Inventors: Andrew Stephen Altman, Westfield, PA (US); Carlton Wesley Cole, Elmira, NY (US); Todd Benson Fleming, Elkland, PA (US); Anping Liu, Horseheads, NY (US); James Joseph Watkins, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 235 days.

(21) Appl. No.: 15/120,003

(22) PCT Filed: Feb. 17, 2015

(86) PCT No.: PCT/US2015/016096
§ 371 (c)(1),
(2) Date: Aug. 18, 2016

(87) PCT Pub. No.: WO2015/126805
PCT Pub. Date: Aug. 27, 2015

(65) Prior Publication Data
US 2017/0050877 A1 Feb. 23, 2017

Related U.S. Application Data

(60) Provisional application No. 61/942,309, filed on Feb. 20, 2014.

(51) Int. Cl.
*C03B 33/09* (2006.01)
*C03B 33/02* (2006.01)
(Continued)

(52) U.S. Cl.
CPC ............ *C03B 33/091* (2013.01); *B23K 26/14* (2013.01); *B23K 26/53* (2015.10);
(Continued)

(58) Field of Classification Search
CPC ... C03B 33/091; C03B 33/04; C03B 33/0222; B23K 26/53; B23K 26/14; B23K 2203/54
See application file for complete search history.

(56) References Cited

U.S. PATENT DOCUMENTS 6,812,430 B2   11/2004   Kang et al.
8,035,901 B2   10/2011   Abramov et al.
(Continued)

FOREIGN PATENT DOCUMENTS

CN   101712529 A   5/2010
CN   102046324 A   5/2011
(Continued)

OTHER PUBLICATIONS

EP15751546.1 Search Report dated Dec. 8, 2017, European Patent Office, 5 pgs.
(Continued)

*Primary Examiner* — Queenie S Dehghan (57) ABSTRACT

Methods and apparatus provide for: cutting a thin glass sheet along a curved cutting line, where the curve is divided into a plurality of line segments; applying a laser beam and continuously moving the laser beam along the cutting line; applying a cooling fluid simultaneously with the application of the laser beam in order to propagate a fracture in the glass sheet along the cutting line; and varying one or more cutting parameters as the laser beam moves from one of the plurality of line segments to a next one of the plurality of line segments, wherein the one or more cutting parameters include at least one of: (i) a power of the laser beam, (ii) a
(Continued)

speed of the movement, (iii) a pressure of the cooling fluid, and (iv) a flow rate of the cooling fluid.

15 Claims, 7 Drawing Sheets

(51) Int. Cl.
    *C03B 33/04* (2006.01)
    *B23K 26/14* (2014.01)
    *B23K 26/53* (2014.01)
    *B23K 103/00* (2006.01)

(52) U.S. Cl.
    CPC .......... *C03B 33/0222* (2013.01); *C03B 33/04* (2013.01); *B23K 2103/54* (2018.08); *Y02P 40/57* (2015.11)

(56) References Cited

U.S. PATENT DOCUMENTS

| | | |
|---|---|---|
| 8,269,138 B2 | 9/2012 | Garner et al. |
| 9,260,337 B2 | 2/2016 | Abramov et al. |
| 9,422,188 B2 | 8/2016 | Garner et al. |
| 2002/0170895 A1 | 11/2002 | Hauer et al. |
| 2003/0201261 A1 | 10/2003 | Kang et al. |
| 2004/0086688 A1* | 5/2004 | Hirano ................. C03B 33/033 428/141 |
| 2005/0221044 A1 | 10/2005 | Gaume et al. |
| 2009/0032505 A1* | 2/2009 | Huang .................. B23K 26/38 219/121.67 |
| 2009/0159580 A1 | 6/2009 | Hsu et al. |
| 2010/0279067 A1 | 11/2010 | Sabia et al. |
| 2011/0250423 A1 | 10/2011 | Fukasawa et al. |
| 2012/0211923 A1* | 8/2012 | Garner .................. C03B 33/04 264/400 |
| 2013/0291598 A1 | 11/2013 | Saito et al. |
| 2014/0027951 A1 | 1/2014 | Srinivas et al. |
| 2015/0191388 A1* | 7/2015 | Abramov ................ C03B 33/04 65/29.18 |

FOREIGN PATENT DOCUMENTS

| | | |
|---|---|---|
| CN | 201890842 U | 7/2011 |
| CN | 102239034 A | 11/2011 |
| EP | 2332890 A1 | 6/2011 |
| EP | 1574485 B1 | 3/2013 |
| JP | 2009078502 A | 4/2009 |
| JP | 2009090598 A | 4/2009 |
| JP | 2009107301 A | 5/2009 |
| JP | 2013119494 A | 6/2013 |
| JP | 2013154604 A | 8/2013 |
| KR | 1081613 B1 | 11/2011 |
| KR | 1094284 B1 | 12/2011 |
| KR | 2012004456 A | 1/2012 |
| KR | 2012004793 A | 1/2012 |
| KR | 1163394 B1 | 7/2012 |
| KR | 1195600 B1 | 10/2012 |
| WO | 0002700 A1 | 1/2000 |
| WO | 2012118083 A1 | 9/2012 |

OTHER PUBLICATIONS

International Search Report and Written Opinion of the International Searching Authority; PCT/US2015/016096; dated May 29, 2015; 10 Pages; Korean Intellectual Property Office.
Lumley, R. M., Controlled Separation of Brittle Materials using a Laser, Am. Ceram. Soc. Bull., 48 (9), pp. 850-854, 1969.
English Translation of TW104105649 Summary of Official Letter and Search Report dated Jun. 4, 2018, Taiwan Patent Office,2 Pgs.
Machine Translation of JP2016552528 Office Action dated Apr. 6, 2019; 5 Pages; Japanese Patent Office.
Chinese Patent Application No. 201580009927.4 Third Office Action dated Sep. 25, 2019; China Patent Office; 9 Pgs.
European Patent Application No. 15751546.1; Office Action dated Sep. 27, 2019, European Patent Office; 7 Pgs.
Japanese Patent Application No. 2016552528; Machine Translation of the Office Action dated Feb. 19, 2020; Jaapn Patent Office; 5 Pgs.

* cited by examiner

METHODS AND APPARATUS FOR CUTTING RADII IN FLEXIBLE THIN GLASS

CROSS-REFERENCE TO RELATED APPLICATIONS

This application claims the benefit of priority under 35 U.S.C. § 371 of International Patent Application Serial No. PCT/US15/16096, filed on Feb. 17, 2015, which in turn, claims the benefit of priority of U.S. Provisional Patent Application Ser. No. 61/942,309 filed on Feb. 20, 2014, the contents of each of which are relied upon and incorporated herein by reference in their entireties.

BACKGROUND

The present disclosure relates to methods and apparatus for cutting radii into flexible thin glass.

Conventional manufacturing techniques for cutting flexible plastic substrates have been developed, where the plastic substrates employ a plastic base material laminated with one or more polymer films. These laminated structures are commonly used in flexible packaging associated with photovoltaic (PV) devices, organic light emitting diodes (OLED), liquid crystal displays (LCD) and patterned thin film transistor (TFT) electronics, mostly because of their relatively low cost and demonstrable performance.

Although the aforementioned flexible plastic substrates have come into wide use, they nevertheless exhibit poor characteristics in connection with at least providing a moisture barrier and providing very thin structures (indeed, the structures are relatively thick owing to the properties of plastic materials).

Accordingly, there are needs in the art for new methods and apparatus for fabricating a flexible substrate for use in, for example, PV devices, OLED devices, LCDs, TFT electronics, etc., particularly where the substrate is to provide a moisture barrier and the substrate is to be formed into a shape having at least one radius at a corner.

SUMMARY

The present disclosure relates to employing a relatively thin, flexible, glass sheet (on the order of less than about 0.2 mm) and cutting the glass sheet into a shape having at least one radius (such as a free-form shape).

Flexible glass substrates offer several technical advantages over the existing flexible plastic substrate in use today. One technical advantage is the ability of the glass substrate to serve as good moisture or gas barrier, which is a primary degradation mechanism in outdoor applications of electronic devices. Another advantage is the potential for the flexible glass substrate to reduce the overall package size (thickness) and weight of a final product through the reduction or elimination of one or more package substrate layers. As the demand for thinner, flexible substrates (on the order of less than about 0.2 mm thick) increases in the electronic display industry, manufacturers are facing a number of challenges for providing suitable flexible substrates.

Although techniques exist for the continuous cutting of ultra-thin glass web, for example glass web measuring less than about 0.2 mm thick, such techniques are generally directed to cutting the glass web into straight strips of particular widths.

A significant challenge in fabricating flexible glass substrates for PV devices, OLED devices, LCDs, TFT electronics, etc., is cutting a source of relatively large, thin glass sheet into smaller discrete substrates of various dimensions and shapes with tight dimensional tolerances, good edge quality, and high edge strength. Indeed, a desired manufacturing requirement is to cut glass parts off a source glass sheet continuously, without interruption of the cutting line, where the cutting line includes at least some round sections (e.g., at least one rounded corner). Although existing mechanical techniques for continuous cutting of irregular (free form) shapes provide for scoring (with a score wheel) and mechanical breaking (or snapping), the edge quality and strength achieved by such mechanical techniques are not sufficient for many applications where precision and/or high edge strength are required. Indeed, the mechanical scoring and breaking approach generates glass particles and manufacturing failures, which decreases the process yield and increases manufacturing cycle time.

In accordance with one or more embodiments herein, a laser cutting technique is employed to cut a thin glass sheet into a free form shape having at least one rounded corner or rounded portion. Glass cutting techniques using a laser are known, however, such techniques are generally directed to cutting glass sheets having thicknesses of at least 0.4 mm and thicker—and the technique involves laser scoring followed by mechanical breaking (score and snap). The cutting of thin flexible glass with thicknesses of less than about 0.2 mm (and even as low as tens of um in a roll format) presents significant challenges, especially when tight dimensional tolerances and high edge strength are required manufacturing objectives. The conventional laser score and mechanical break process is nearly impossible to reliably employ with glass sheet thicknesses of less than about 0.2 mm. Indeed, due to the relatively thin profile of a glass sheet of less than about 0.2 mm, the stiffness of the sheet is very low (i.e., the sheet is flexible), and the laser score and snap cutting process is easily adversely affected by thermal buckling, mechanical deformation, air flows, internal stress, glass warpage, and many other factors. In order to remove edge macro-cracks and improve edge strength after a conventional cutting process, the cut edges must be fine polished to avoid further cracks and failure. This in turn, increases production costs and reduces yields.

In contrast, the embodiments herein present laser cutting techniques resulting in free form shapes of thin flexible glass, whereby one-step, continuous, full separation process in which a free form shape is obtained from a source glass sheet. Importantly, the cutting technique results in high edge strength (at least greater than about 150 MPa) even along the radii.

The novel methodology and apparatus provides for the propagation of an initiation flaw, for example a crack in the source glass sheet, via a laser (for example a CO2 laser beam) and simultaneous provision of a cooling fluid (for example a gas, such as air). The methodology and apparatus is applicable to thin and ultra-thin glass sheets with thicknesses of less than about 0.2 mm, for example between about 0.02 mm to 0.2 mm, between about 0.05 mm to 0.2 mm, and/or between about 0.1 mm to 0.2 mm. Notably, cutting of thinner glass sheets is possible, and the cutting of thicker glass sheets (i.e., greater than about 0.2 mm) is also possible.

Advantages of the embodiments herein include: (i) reducing crack propagation defects (such as hackle and chipping) and thereby reducing particle generation; (ii) reducing surface scratches, improving edge strength, and reducing surface roughness (due to the one-step, touch-free process); (iii) increasing production yields (elimination of mechanical snapping and resultant unwanted cracks and breaks); (iv) optimizing free-form cutting, including curvature radii as low as about 2 mm; (v) increasing the strength of the glass substrate (due to the addition of at least one rounded edge to the structure, as compared to scribed glass having sharp edges that are easily chipped); (vi) eliminating the need for finishing (grinding and polishing); (vii) lowering production costs; (viii) increasing the quality (such as increasing strength) of the cut edge; (ix) increasing the control of the cutting process (due to thermally controlled crack propagation, as compared to scored cracks, which are very difficult to control with thin glass); (x) improving process capabilities (such as improvement in adjustments to glass thickness differences in thin glass (due to the use of laser separation, as compared to scribing which only adjusts well for greater than about 0.5 mm thicknesses, but does not adjust well to thickness differences experienced in glass of less than about 0.5 mm thickness); (xi) simplifying the cutting equipment (as the laser equipment may be readily available from commercial vendors); (xii) improving cutting options (for example, permitting the initiation of the cut anywhere on the source glass sheet, not just from an edge); (xiii) improving cutting results, for example permitting complete separation from the source glass sheet upon completion of the laser cut (as opposed to scoring, which requires one or more intermediate steps as waste sections of the source glass sheet are cracked off from the glass substrate, thereby resulting in added stress in the glass); (ixx) reducing and/or eliminating edge contamination (as compared to mechanical scoring, which can embed contaminates into the glass edge and/or onto the glass surface); (xx) improving cut precision and consistency; and (xxi) eliminating lateral cracks (due to the laser cut edge increasing the part overall component strength and life expectancy, thereby satisfying a need in the art).

Other aspects, features, and advantages will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

Figure 1:
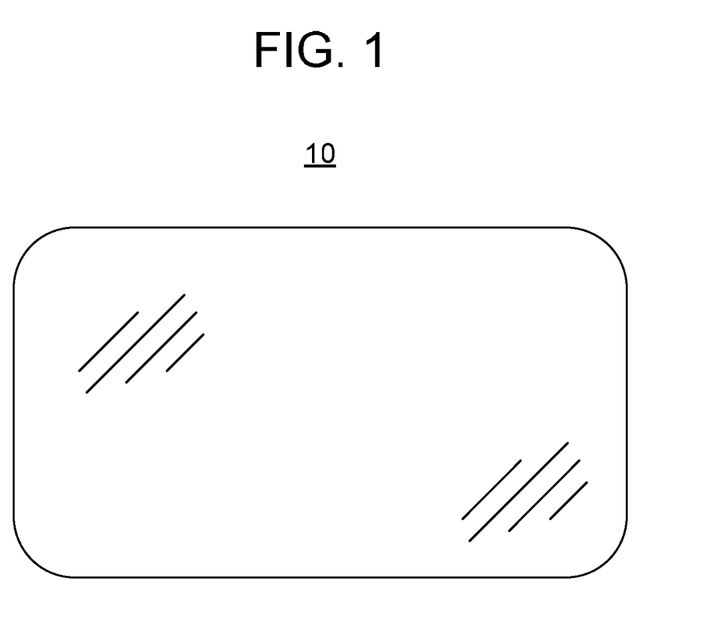
FIG. 1 is top view of a thin, glass substrate produced using one or more cutting methodologies and apparatus disclosed herein.

With reference to the drawings wherein like numerals indicate like elements there is shown in FIG. 1 a top view of a thin, glass substrate 10 produced using one or more cutting methodologies and apparatus disclosed herein. A number of characteristics of the glass substrate 10 are of importance when considering the disclosure herein. First, the glass substrate 10 (and the source glass sheet from which it is cut) is thin and/or ultra-thin, with a thickness of less than about 0.2 mm, for example between about 0.01 mm to 0.2 mm, between about 0.05 mm to 0.2 mm, and/or between about 0.1 mm to about 0.2 mm. While these thicknesses are considered preferable, the glass substrate 10 may be thinner and/or thicker than the ranges mentioned. Second, the glass substrate 10 is considered a free form shape, for example having at least one curved portion, having one or more radii of curvature anywhere from a minimum of about 2 mm up to about 20 mm. For example, the glass substrate 10 is shown with four rounded corners, although any other shape may be employed, for example having a mix of rounded corners, sharp corners, straight beveled corners, etc. Third, the edge strength of the curved portions are very high, such as greater than about 150 MPa, greater than about 200 MPa, greater than about 300 MPa, and/or greater than about 400 MPa.

Figure 2:
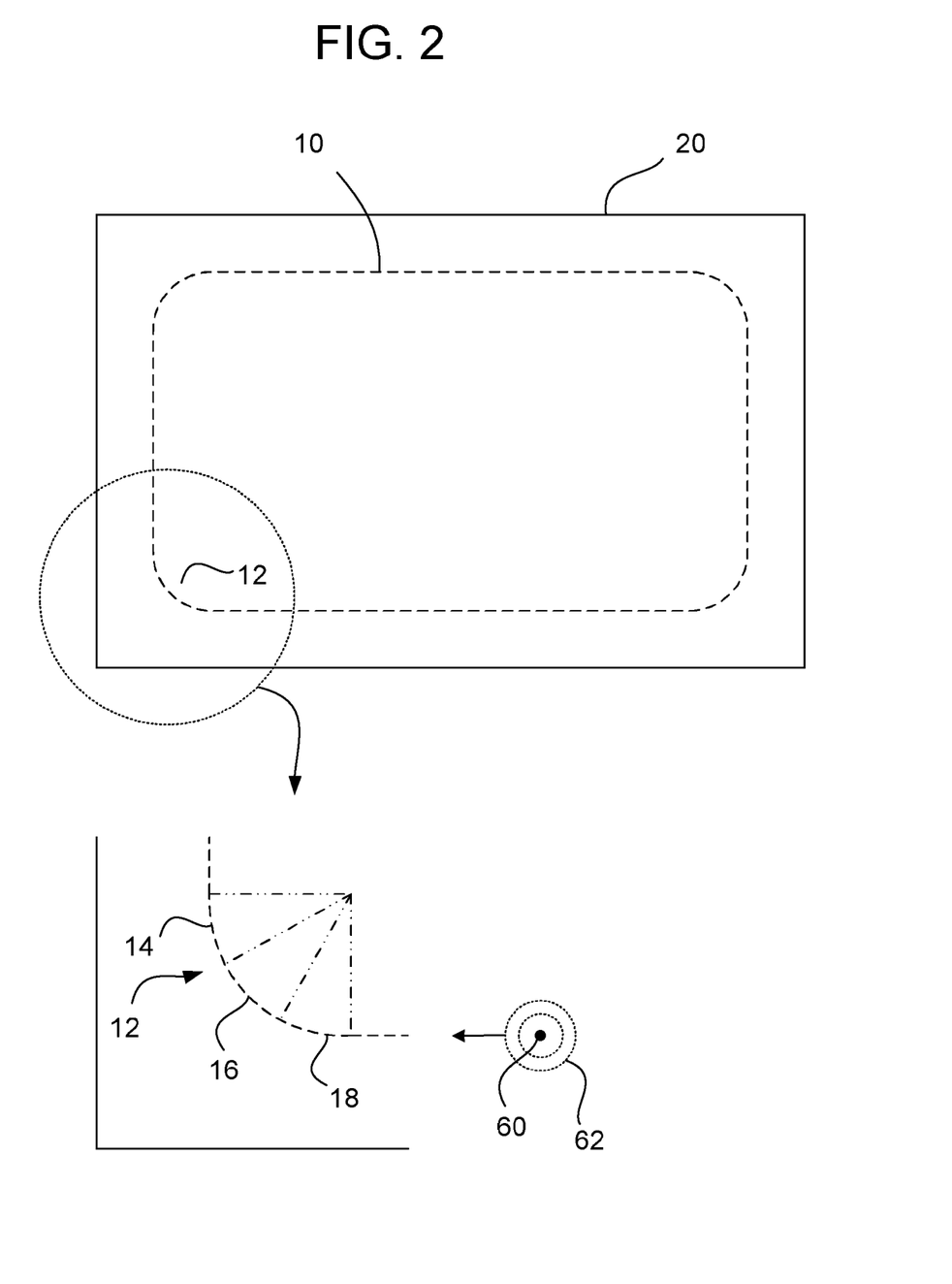
FIG. 2 is a top view of a source glass sheet from which the glass substrate of FIG. 1 may be produced.

Reference is now made to FIG. 2, which is a top view of a source glass sheet 20 from which the glass substrate 10 of FIG. 1 may be produced. The novel methodology and apparatus disclosed herein provides for cutting the glass substrate 10 via propagation of an initiation flaw, for example a crack in the source glass sheet, using a laser (for example a CO2 laser beam) and simultaneous provision of a cooling fluid (for example a gas, for example air). In general, this arrangement results in the controlled propagation of the crack in the source glass sheet 20 along a desired cutting line in order to separate the glass substrate 10 from the glass sheet 20. A more detailed discussion of the methodology and apparatus for carrying out the initiation, propagation, and termination of the crack is provided later in this description.

As an initial phase of the process, the source glass sheet 20 (of the aforementioned thickness) is supported on a suitable support structure (which will be discussed in more detail later herein) and a free form cutting line (the dashed line in FIG. 2) is defined that establishes a closed pattern, where the cutting line circumscribes the desired final shape of the glass substrate 10. Those skilled in the art will appreciate that the specific shape of the free-form cutting line is highly dependent on the specific, intended application for the glass substrate 10. For example, although the illustrated cutting line is a closed-curve, such need not be the case. Indeed, an alternative cutting line may include one or more curved sections and one or more other sections that include some of original edge portions of the glass sheet 20. In such case, the cutting line may intersect one or more of the original edge portions of the glass sheet 20, whereby the glass substrate 10 may include such edge portions.

An important aspect in connection with defining the cutting line is illustrated in the expanded view of one of the rounded portions 12 thereof. In particular, the non-straight, rounded portion 12 has a radius of less than about 20 mm (such as between about 1 mm and about 20 mm), and the rounded portion 12 is divided into a plurality of sequential line segments 14, 16, 18, etc. The line segments 14, 16, 18 may be of the same length or of differing lengths. As will be discussed in greater detail later herein, these line segments 14, 16, 18, represent portions of the cutting line in which one or more cutting parameters are varied as the laser beam moves from one of the line segments to a next one of the line segments.

There are a number of options for the start and/or finish of the cutting line. For example, one option is that the start and finish of the cutting line are co-incident, whereby the cutting line is entirely coincident with the desired contour of the glass substrate 10. Alternatively, the start of the cutting line may be at a different point as compared to the finish of the cutting line. For example, the start and/or finish of the cutting line may be at respective edges of the glass sheet 20 (which are not coincident with the cutting line). An initial crack (or fracture, or initiation flaw) is provided at the start of the cutting line, in particular over a small length (e.g., about 5 mm to 10 mm long) on the glass sheet 20. Subsequently, the initial crack is lengthened and propagated using the aforementioned laser cutting technique. In general, the glass sheet 20 is scored at the initial crack using a mechanical scoring device, for example a score wheel, or via a laser based crack initiation technique. In order to appreciate the significance of the crack initiation and subsequent propagation, a more detailed discussion of the laser cutting technique will first be provided.

The laser beam is used to heat the glass sheet 20 in a localized area and a source of cooling fluid is used to rapidly cool that area in order to create transient tensile stress via the resultant temperature gradient. The aforementioned initial crack is created by introducing a small initial flaw on the surface of the glass sheet 20, which is then transformed into a vent (the crack) propagated by heating the localized zone via the laser and cooling that zone via quenching action produced by the cooling fluid. The tensile stress, $\sigma$, produced during the process is proportional to $\alpha*E*\Delta T$, where $\alpha$ is a linear thermal expansion coefficient of the glass sheet 20, E is a modulus of elasticity of the glass sheet 20, and $\Delta T$ is a temperature difference on the surface of the glass sheet 20 produced by the heating (from the laser) the cooling (from the fluid). The tensile stress is controlled in order to be higher than the molecular bonds of the glass sheet 20. For a given $\alpha*E$ tensile stress, $\sigma$ can be increased by heating the glass sheet 20 to a higher temperature via the laser. However, overheating the glass sheet 20 (above its strain point) will cause an ablation and irreversible high residual stress, which deteriorates the quality of the cut edge and reduces edge strength. The described method uses full body glass separation (cutting), where the vent depth is equal to the thickness of the glass.

Figure 3:
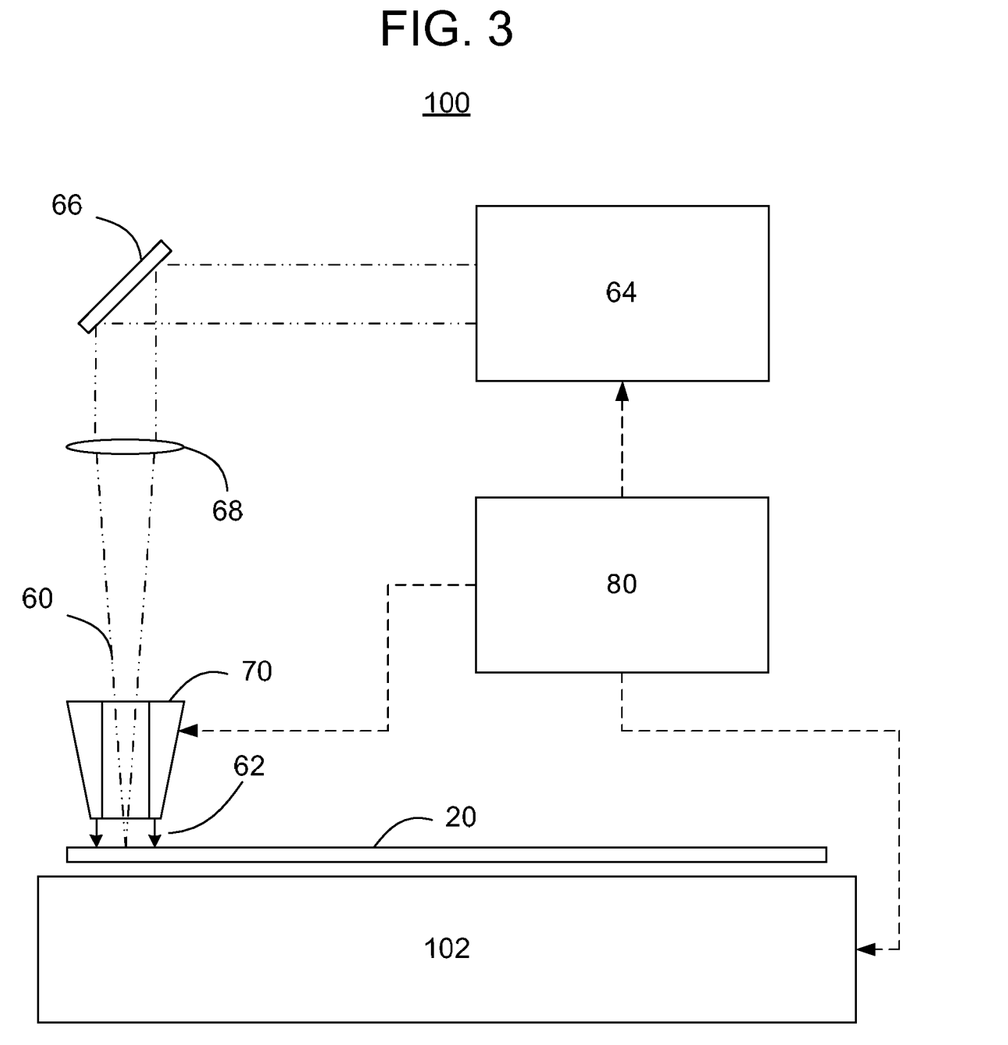
FIG. 3 is a schematic illustration of an apparatus that may be used to cut the glass substrate from the glass sheet.

Reference is now made to FIG. 2 and FIG. 3, the latter figure being a schematic illustration of an apparatus 100 that may be used to cut the glass substrate 10 from the glass sheet 20. The glass sheet 20 may be supported using a support structure 102 (which will be described in greater detail later herein). By way of example, the laser beam 60 may be implemented using a source 64 of laser energy, folding optics 66, and focusing optics 68. Those skilled in the art will appreciate that many variations in the specific of the optics implementation exist. Application of the laser beam 60 to the glass sheet 20 starting at the initial crack initiates propagation of the crack. Continuous moving of the laser beam 60 relative to the glass sheet 20 along the cutting line elevates the temperature of the glass sheet 20 at the cutting line. Simultaneously, the cooling fluid 62 is applied relative to the laser beam 60 (via a nozzle 70), such that the cooling fluid 62 causes a temperature differential in the glass sheet 20 in order to induce the aforementioned tensile stress and propagate the crack (i.e., a fracture or vent) in the glass sheet 20 along the cutting line. Movement of the laser beam 60 and nozzle 70 relative to the glass sheet 20 may be achieved through any of the known conveyance mechanisms.

It has been discovered that curved, free form laser cutting may be achieved using a laser beam 60 of a substantially round shape surrounded by an annular, circular, ring-shaped coolant zone 62 (achieved using the coolant source nozzle 70). The circular laser beam 60, together with the annular coolant zone 62 does not exhibit any predefined or inherent orientation (as is the case with significantly elliptical laser beams), and therefore can be used to propagate the crack in any direction (without having to use any complex beam shaping techniques or provide any additional motion axes for movement of the nozzle 70). While nozzles that produce annular, ring-shaped fluid flow in laser cutting applications are known, they have heretofore been applied to straight laser cutting methodologies or to cutting thicker glass via the score and break method (where a partial vent is created followed by mechanical break). In contrast, the embodiments herein employ a ring nozzle 70 for a full body separation (or cut) of a thin glass sheet 20. Additionally, while small diameter laser beams are also known for free form laser cutting, the embodiments herein apply a combination of the nozzle 70 for annular fluid flow (in stationary relationship to the laser beam 60), and other cutting variables to achieve superior edge characteristics, including high edge strength. For a small, substantially round beam, the diameter of the laser beam 60 may be about 1-5 mm, preferably between about 2-4 mm. For a small, moderately non-circular beam, an aspect ratio of the laser beam 60 may be less than about 2, and a diameter of the laser beam 60 may be less than about 5 mm. The laser beam 60 may be of a Gaussian, non-Gaussian, or flat-top beam power distribution.

The source of laser power 64 may be implemented using CO2 laser mechanisms, however, other implementations are possible, for example a fiber laser, an Nd:YAG laser, or other laser systems. A carbon dioxide laser operates at the wavelength of 10.6 µm. In general, using a laser beam 60 having the diameters disclosed herein allows certain advantageous effects: (i) minimization of edge imperfections associated with the crack initiation (the smaller the beam diameter, the smaller the unstable crack propagation zone); (ii) ability to propagate the crack nearly to the edge of the glass sheet 20 (i.e., to permit termination of the crack in proximity to the edge of the glass sheet 20, thereby avoiding a hook at the end of the cut; and (iii) maintaining reasonably high cutting speed even with a small diameter beam, resulting in relatively short processing time and high throughput.

As noted above, a very desirable edge characteristic for the glass substrate 10 is high edge strength, on the straight portions as well as on the curved portions. For thin glass substrates (less than about 0.2 mm) high edge strength of greater than about 150 MPa, greater than about 200 MPa, greater than about 300 MPa, and/or greater than about 400 MPa are not conventionally achievable, especially on the curved edges. In order to achieve the aforementioned high edge strength, one or more of the cutting parameters are varied as the laser beam moves from one of the plurality of line segments 14, 16, 18, etc. to a next one of the plurality of line segments. These cutting parameters may include at least one of: (i) a power of the laser beam, (ii) a speed of the movement, and (iii) at least one of a pressure and flow rate of the cooling fluid.

These cutting parameters may be controlled via a controller 80, for example implemented using a computer system employing a microprocessor, memory, and software code. The controller commands certain characteristics of the laser source 64, the nozzle 70, and/or the support structure 102. For example, the controller 80 may operate to vary the power of the laser beam 60 such that the power level is different in at least one of the line segments 14, 16, 18, etc. as compared to others of the line segments. By way of example, the definition of "different" as concerns the power level may be at least about 2%, at least about 5%, and/or at least about 10%. In another embodiment, the controller 80 may operate to vary the power of the laser beam 60 such that the power level is different in all of the line segments 14, 16, 18, etc. Additionally and/or alternatively, the controller 80 may operate to vary the speed of the movement of the laser beam 60 relative to the glass sheet 20 such that the speed is different in at least one of the line segments 14, 16, 18, etc. as compared to others of the line segments. By way of example, the definition of "different" as concerns the speed may be at least about 2%, at least about 5%, and/or at least about 10%. In another embodiment, the controller 80 may operate to vary the speed of the movement of the laser beam 60 relative to the glass sheet 20 such that the speed is different in all of the line segments 14, 16, 18, etc. Additionally and/or alternatively, the controller 80 may operate to vary at least one of the pressure and flow rate of the cooling fluid 62 such that at least one of the pressure and flow rate are different in at least one of the line segments 14, 16, 18, etc. as compared to others of the line segments. By way of example, the definition of "different" as concerns the flow rate may be at least about 2%, at least about 5%, and/or at least about 10%. In another embodiment, the controller 80 may operate to vary at least one of the pressure and flow rate of the cooling fluid 62 such that at least one of the pressure and flow rate are different in all of the line segments 14, 16, 18, etc. Additionally and/or alternatively, the controller 80 may operate to vary a supply of air pressure and/or flow of a support fluid from the support structure 102, which adjusts a fly height of the glass sheet 20 above the support structure 102, as the laser beam 60 moves through at least one of the line segments 14, 16, 18, etc. as compared to others of the line segments.

Figure 4A:
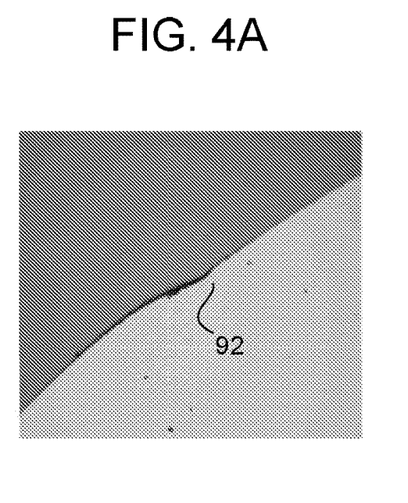
FIGS. 4A-4B are digital images of a top view and side view, respectively, of a cut edge of a given radius using a conventional laser cutting methodology.
Figure 4B:
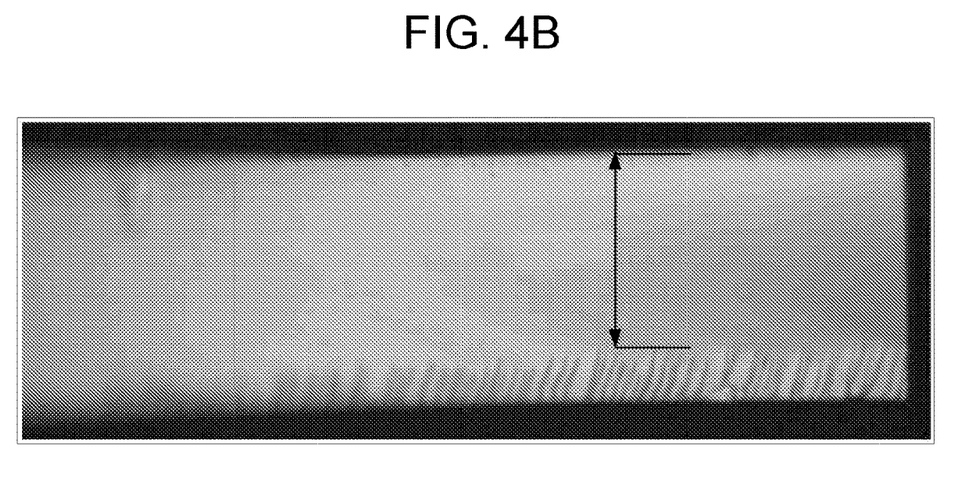
Figure 5A:
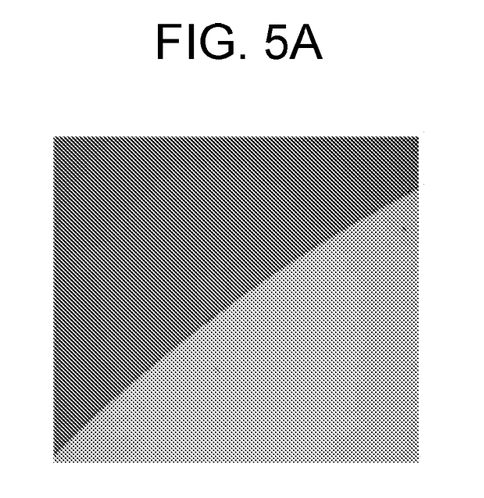
FIGS. 5A-5B are digital images of a top view and side view, respectively, of a cut edge of a given radius using the cutting methodology of one or more embodiments herein.
Figure 5B:
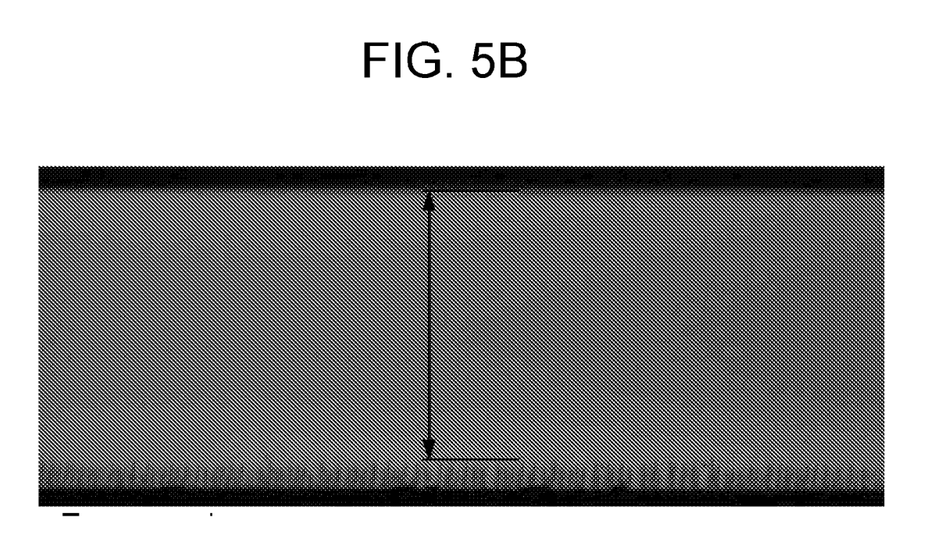

The controller 80 operates to vary the cutting parameters through the line segments 14, 16, 18 in order to control the temperature and stresses within the glass sheet 20 as the crack is propagated along the cutting line. The variability of the cutting parameters results in improvements in the edge characteristics of the cut edge, including edge strength, shear, compression, twist hackle, etc. For example, reference is made to FIGS. 4A-4B, which are digital images of a top view and a side view, respectively, of a cut edge of a given radius (less than about 20 mm) of a thin glass substrate (about 0.2 mm). Notably, the cut edge was produced without varying the cutting parameters through any line segments of the cutting line as the laser beam 60 traversed the rounded portion. Consequently, a number of undesirable edge characteristics are evident, including large shear, large compression, large twist hackle, and evidence of an arrest feature 92, where the illustrated dimension is about 105 um. In comparison, reference is made to FIGS. 5A-5B, which are digital images of a top view and a side view, respectively, of a cut edge of a given radius (less than about 20 mm) of a thin glass substrate (about 0.2 mm). Notably, the cut edge was produced by varying the cutting parameters through one or more of the line segments of the cutting line as the laser beam 60 traversed the rounded portion. Consequently, a number of desirable edge characteristics are evident, including low shear, low compression, low twist hackle, and no evidence of any arrest features, where the illustrated dimension is about 114.08 um.

Another important set of parameters in connection with achieving satisfactory cut edge quality on the finished glass substrate 10 is providing the functions of transporting the glass sheet 20 (into and out of the cutting zone of the apparatus 100) and holding the glass sheet 20 during the cutting process. Assuming that the support structure 102 will be used for transportation, scoring, and laser cutting (which is a desirable combination), then the surface properties of the support structure 102 (especially the surface underneath the glass sheet 20), and the mechanisms contributing to the support of the glass sheet 20 during cutting are important for cutting thin flexible glass of the thicknesses contemplated herein. In order to use a mechanical scoring mechanism for crack initiation, the hardness of the surface of the support structure 102 should be relatively hard to avoid flexing. In addition, the surface of the support structure 102 should be able to withstand relatively high temperatures generated by the laser beam 60. In order to move the glass sheet 20 into position for scoring, laser cutting, and then moving the glass substrate 10 (after the cutting process is complete) an air bearing mechanism is provided in the support structure 102. The air bearing may be achieved via a porous surface of the support structure 102, where the table provides a variable air-bearing mode (variability of bearing fluid pressure and/or flow rate). The support bearing fluid of the air bearing is delivered from the surface of the support structure 102 by way of the porosity of the surface and a source of fluid of varying pressure and flow (not shown). The air bearing mode operates to bias the glass sheet 20 away from the surface of the table of the support structure 102 as the laser beam 60 elevates the temperature of the glass sheet 20 and the cooling fluid 62 is directed in opposing fashion to the support fluid.

Figure 6A:
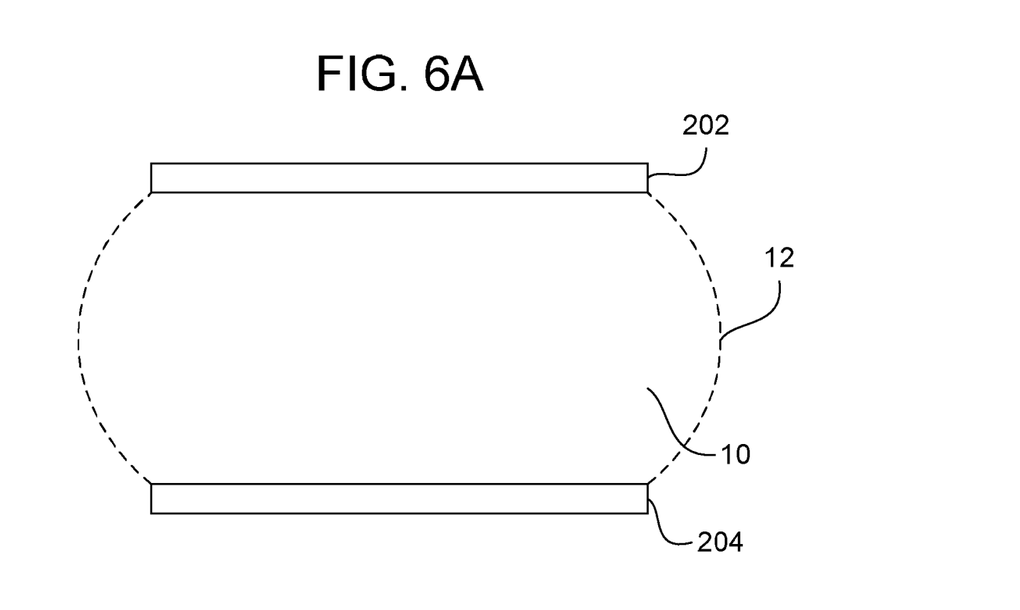
FIGS. 6A-6B are schematic illustrations of a front view and a side view, respectively, of a set up for testing the edge strength of a cut edge (having a radius) of a glass substrate.
Figure 6B:
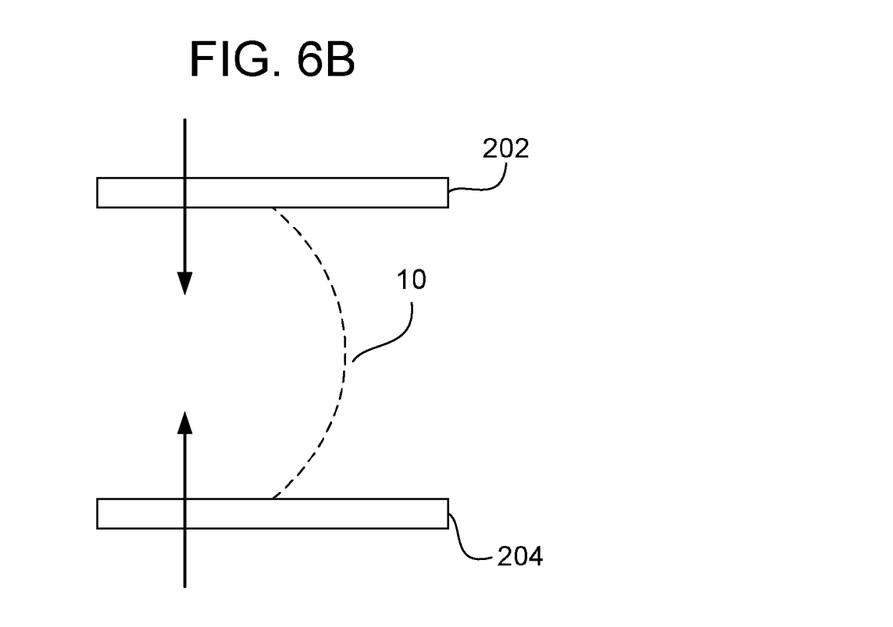

Reference is now made to FIGS. 6A-6B, which are schematic illustrations of a front view and a side view, respectively, of a set up for testing the edge strength of a glass substrate 10 using a novel two-point bend methodology. Conventional two-point testing methodologies operate to test the edge strength of a straight edge. The test set up illustrated in FIGS. 6A-6B, however, operates to test the edge strength of a rounded edge 12 (e.g., having a radius less than about 20 mm). The test set up includes an upper platen 202 and a lower platen 204, whereby the glass substrate 10 is disposed between the platens 202, 204. In the illustrated example, the glass substrate 10 includes symmetrical rounded portions on the lateral sides thereof as well as substantially straight upper and lower edges, which engage the upper and lower platens 202, 204. As best seen in FIG. 6B, the upper and lower platens 202, 204 are moved toward one another in order to flex the glass substrate 10 and present a large stress to the apexes of the rounded portion 12 of the glass substrate 10. The platens 202, 204 are advanced until the glass substrate 10 breaks.

Figure 7:
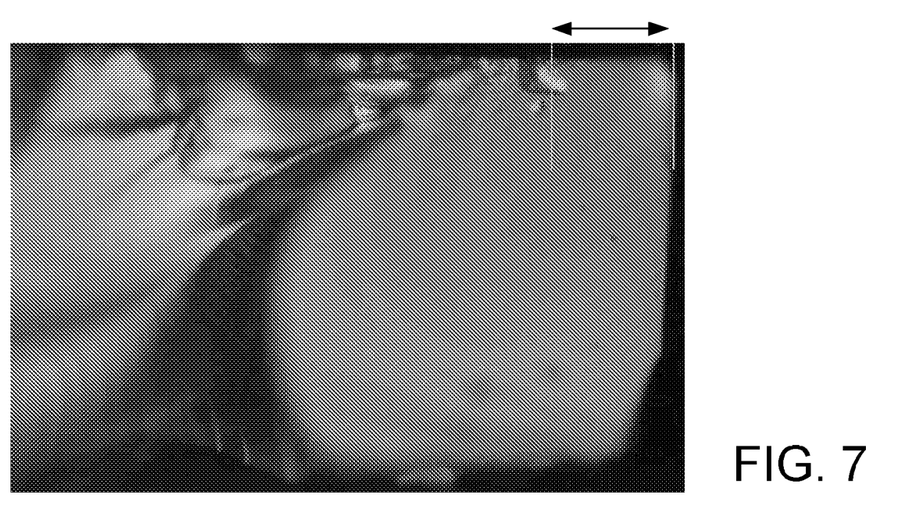
FIG. 7 is a digital image of a cut edge of a glass substrate, which shows an example of the mirror finish radius resulting from the test set up of FIGS. 6A-6B.

Next, the break point is identified by examining the fractured edge of the rounded portion 12. For example, as shown in FIG. 7, the mirror-finish radius of the rounded portion 12 may be examined using a suitable inspection apparatus. This entails employing some methodology (conventional or otherwise) for estimating the fracture stress of glass. For example, the results in FIG. 7 were obtained using microscopy, whereby a length of about 36 um was measured between the hash marks, i.e., the mirror-radius length used in determining the fracture stress for the samples. Those skilled in the art will appreciate the steps in such a process based on known technologies.

Using the above testing setup, a number of glass substrate 10 samples were tested. The glass substrate samples were prepared by cutting glass sheets of 130 µm thickness using the cutting process discussed above. In the straight sections of the cutting line, the cutting parameters included: (i) a laser power of 3.8 watts, (ii) a speed of 860 mm/m, and (iii) an nozzle air flow of 100 l/m. As discussed above, in the curved portions of the cutting line, one or more of the cutting parameters are varied as the laser beam moves from one of the plurality of line segments 14, 16, 18 to a next one of the plurality of line segments. In particular, in segment 14 the cutting parameters included: (i) a laser power of 3.0 watts, (ii) a speed of 300 mm/m, and (iii) an nozzle air flow of 100 l/m. In segment 16 the cutting parameters included: (i) a laser power of 3.0 watts, (ii) a speed of 350 mm/m, and (iii) an nozzle air flow of 100 l/m. In segment 18 the cutting parameters included: (i) a laser power of 3.0 watts, (ii) a speed of 325 mm/m, and (iii) an nozzle air flow of 100 l/m.

Figure 8:
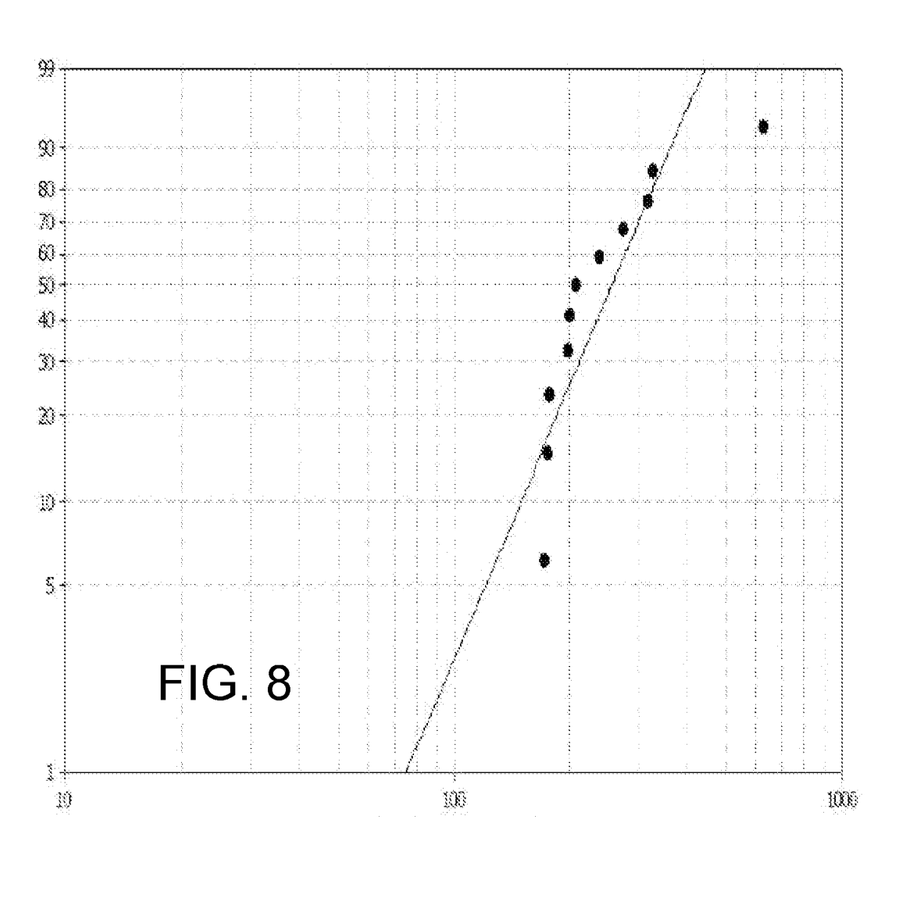
FIG. 8 is a Weibull plot of edge strength (of edges with radii) indicating very high edge strength using the methodologies of one or more embodiments herein.

With reference to FIG. 8, the resulting test data are presented on a Weibull plot (with failure probability along the Y-axis and maximum bend stress in MPa along the X-axis). The plot shows the fracture stress in MPa and the data points reveal that for the samples tested, the edge strength of the rounded portions were between 100 to 700 MPa. Further, samples having hackle of greater than about 50% of the glass thickness were noted as being undesirable and indicative of a cutting process in need of adjustment.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application. For example, various features of the invention may be combined according to the following aspects.

According to a first aspect, there is provided a method, comprising:
supporting a source glass sheet of about 0.2 mm or less in thickness;
defining a cutting line having at least one non-straight portion of a radius of less than about 20 mm, where the cutting line defines a desired shape of a glass substrate;
dividing the non-straight portion of the cutting line into a plurality of sequential line segments;
initiating a flaw in the glass sheet;
applying a laser beam to the glass sheet starting at the flaw and continuously moving the laser beam and the glass sheet relative to one another along the cutting line to elevate a temperature of the glass sheet at the cutting line;
applying a cooling fluid simultaneously with the application of the laser beam, such that the cooling fluid at least reduces the temperature of the glass sheet in order to propagate a fracture in the glass sheet along the cutting line;
varying one or more cutting parameters as the laser beam moves from one of the plurality of line segments to a next one of the plurality of line segments, wherein the one or more cutting parameters include at least one of: (i) a power of the laser beam, (ii) a speed of the movement, (iii) a pressure of the cooling fluid, and (iv) a flow rate of the cooling fluid; and
separating waste glass from the glass sheet to obtain the glass substrate of the desired shape.

According to a second aspect, there is provided the method of aspect 1, wherein at least one of:
the laser beam is substantially circular having a diameter of the laser beam is one of: (i) between about 1 mm to about 5 mm, and (ii) between about 2 mm to about 4 mm; and
the laser beam is moderately non-circular having an aspect ratio of less than about 2 and a diameter of less than about 5 mm.

According to a third aspect, there is provided the method of aspect 1 or aspect 2, further comprising varying the power of the laser beam such that the power level is different, by one of: at least about 2%, at least about 5%, and at least about 10%, in at least one of the line segments as compared to others of the line segments.

According to a fourth aspect, there is provided the method of aspect 3, further comprising varying the power level of the laser beam such that the power level is different, by one of: at least about 2%, at least about 5%, and at least about 10%, in all of the line segments.

According to a fifth aspect, there is provided the method of any one of aspects 1-4, further comprising varying a power level of the laser beam such that the power level is higher, by one of: at least about 2%, at least about 5%, and at least about 10%, when the cutting line is straight as compared with when the cutting line is curved.

According to a sixth aspect, there is provided the method of any one of aspects 1-5, further comprising varying the speed of the movement of the laser beam relative to the glass sheet such that the speed is different, by one of at least about 2%, at least about 5%, and at least about 10%, in at least one of the line segments as compared to others of the line segments.

According to a seventh aspect, there is provided the method of aspect 6, further comprising varying the speed of the movement of the laser beam relative to the glass sheet such that the speed is different, by one of: at least about 2%, at least about 5%, and at least about 10%, in all of the line segments.

According to an eighth aspect, there is provided the method of any one of aspects 1-7, further comprising varying a speed of the movement of the laser beam relative to the glass sheet such that the speed is higher, by one of: at least about 2%, at least about 5%, and at least about 10%, when the cutting line is straight as compared with when the cutting line is curved.

According to a ninth aspect, there is provided the method of any one of aspects 1-8, further comprising varying at least one of the pressure and flow rate of the cooling fluid such that at least one of the pressure and flow rate are different, by one of: at least about 2%, at least about 5%, and at least about 10%, in at least one of the line segments as compared to others of the line segments.

According to a tenth aspect, there is provided the method of aspect 9, further comprising varying at least one of the pressure and flow rate of the cooling fluid such that at least one of the pressure and flow rate are different, by one of: at least about 2%, at least about 5%, and at least about 10%, in all of the line segments.

According to an eleventh aspect, there is provided the method of any one of aspects 1-10, wherein the cooling fluid is directed annularly about the laser beam toward the glass sheet.

According to a twelfth aspect, there is provided an apparatus, comprising:
a support table operating to support a glass sheet of about 0.2 mm or less in thickness, the glass sheet having a defined cutting line including at least one non-straight portion of a radius of less than about 20 mm, where the non-straight portion of the cutting line is divided into a plurality of sequential line segments, and where the cutting line defines a desired shape of a glass substrate;

a device operating to score the glass sheet to produce an initial flaw;

a laser source operating to apply a laser beam to the glass sheet starting at the initial flaw and continuously moving the laser beam and the glass sheet relative to one another along the cutting line to elevate a temperature of the glass sheet at the cutting line;

a source of cooling fluid operating to apply a cooling fluid simultaneously with the application of the laser beam, such that the cooling fluid at least reduces the temperature of the glass sheet in order to propagate a fracture in the glass sheet along the cutting line;

a controller operating to vary one or more cutting parameters as the laser beam moves from one of the plurality of line segments to a next one of the plurality of line segments, wherein the one or more cutting parameters include at least one of: (i) a power of the laser beam, (ii) a speed of the movement, (iii) a pressure of the cooling fluid, and (iv) a flow rate of the cooling fluid.

According to a thirteenth aspect, there is provided the apparatus of aspect 12, wherein at least one of:

the laser beam is substantially circular having a diameter of the laser beam is one of: (i) between about 1 mm to about 5 mm, and (ii) between about 2 mm to about 4 mm; and the laser beam is moderately non-circular having an aspect ratio of less than about 2 and a diameter of less than about 5 mm.

According to a fourteenth aspect, there is provided the apparatus of aspect 12 or aspect 13, wherein the controller operates to one of:

vary the power of the laser beam such that the power level is different in at least one of the line segments as compared to others of the line segments; and vary the power level of the laser beam such that the power level is different in all of the line segments.

According to a fifteenth aspect, there is provided the apparatus of any one of aspects 12-14, wherein the controller operates to one of:

vary the speed of the movement of the laser beam relative to the glass sheet such that the speed is different, by one of: at least about 2%, at least about 5%, and at least about 10%, in at least one of the line segments as compared to others of the line segments; and vary the speed of the movement of the laser beam relative to the glass sheet such that the speed is different, by one of at least about 2%, at least about 5%, and at least about 10%, in all of the line segments.

According to a sixteenth aspect, there is provided the apparatus of any one of aspects 12-15, wherein the controller operates to one of:

vary at least one of the pressure and flow rate of the cooling fluid such that at least one of the pressure and flow rate are different, by one of: at least about 2%, at least about 5%, and at least about 10%, in at least one of the line segments as compared to others of the line segments; and vary at least one of the pressure and flow rate of the cooling fluid such that at least one of the pressure and flow rate are different, by one of: at least about 2%, at least about 5%, and at least about 10%, in all of the line segments.

According to a seventeenth aspect, there is provided the apparatus of any one of aspects 12-16, wherein the cooling fluid is directed annularly about the laser beam toward the glass sheet.

According to an eighteenth aspect, there is provided an apparatus, comprising:

a glass substrate of about 0.2 mm or less in thickness that has been laser cut from a source glass sheet, wherein the glass substrate includes at least one non-straight portion having a radius of less than about 20 mm, and an edge strength of the at least one non-straight portion is greater than about 150 MPa, and the at least one non-straight portion is not strengthened by polishing.

According to a nineteenth aspect, there is provided the apparatus of aspect 18, wherein the edge strength of the at least one non-straight portion is greater than about 300 MPa.

According to a twentieth aspect, there is provided the apparatus of aspect 18 or aspect 19, wherein the edge strength of the at least one non-straight portion is greater than about 400 MPa.

According to a twenty first aspect, there is provided the apparatus of any one of aspects 18-20, wherein the hackle size is less than about 50% of the glass thickness.

The invention claimed is:

1. A method, comprising:
   supporting a source glass sheet of about 0.2 mm or less in thickness;
   defining a cutting line having at least one non-straight portion of a radius of less than about 20 mm, where the cutting line defines a desired shape of a glass substrate;
   dividing the non-straight portion of the cutting line into a plurality of sequential line segments;
   initiating a flaw in the glass sheet;
   applying a laser beam to the glass sheet starting at the flaw and continuously moving the laser beam and the glass sheet relative to one another along the cutting line to elevate a temperature of the glass sheet at the cutting line;
   applying a cooling fluid simultaneously with the application of the laser beam, such that the cooling fluid at least reduces the temperature of the glass sheet in order to propagate a fracture in the glass sheet along the cutting line;
   varying a speed of movement of the laser beam as the laser beam moves from one line segment to a next line segment
   such that the speed is higher, by at least about 10% when the cutting line is straight as compared with when the cutting line is curved; and
   separating waste glass from the glass sheet to obtain the glass substrate of the desired shape.

2. The method of claim 1, wherein the laser beam is substantially circular having a diameter of between about 1 mm to about 5 mm, or the laser beam is moderately non-circular having an aspect ratio of less than about 2 and a diameter of less than about 5 mm.

3. The method of claim 1, wherein the cooling fluid is directed annularly about the laser beam toward the glass sheet.

4. The method of claim 1 wherein the resulting glass substrate has a non-straight edge portion with an edge strength of greater than about 150 MPa, and the at least one non-straight edge portion is not strengthened by polishing.

5. The method of claim 1 wherein the resulting glass substrate has a non-straight edge portion with an edge strength of the at least one non-straight edge portion is greater than about 300 MPa.

6. The method of claim 1 wherein the resulting glass substrate has a non-straight edge portion with an edge strength of the at least one non-straight edge portion is greater than about 400 MPa.

7. The method of claim 1 wherein the resulting glass substrate has a hackle size is less than about 50% of the glass thickness.

8. The method of claim 1, further comprising varying a power level of the laser beam as the laser beam moves from one line segment to a line segment such that the power level is higher, by at least about 10% when the cutting line is straight as compared with when the cutting line is curved.

9. A method, comprising:
supporting a source glass sheet of about 0.2 mm or less in thickness;
defining a cutting line having at least one non-straight portion of a radius of less than about 20 mm, where the cutting line defines a desired shape of a glass substrate;
dividing the non-straight portion of the cutting line into a plurality of sequential line segments;
initiating a flaw in the glass sheet;
applying a laser beam to the glass sheet starting at the flaw and continuously moving the laser beam and the glass sheet relative to one another along the cutting line to elevate a temperature of the glass sheet at the cutting line;
applying a cooling fluid simultaneously with the application of the laser beam, such that the cooling fluid at least reduces the temperature of the glass sheet in order to propagate a fracture in the glass sheet along the cutting line;
varying a speed of the movement of the laser beam as the laser beam moves from one line segment to a next line segment, such that the power and/or speed varies by at least about 2% between all subsequent line segments; and
separating waste glass from the glass sheet to obtain the glass substrate of the desired shape.

10. The method of claim 9, wherein the laser beam is substantially circular having a diameter of between about 1 mm to about 5 mm, or the laser beam is moderately non-circular having an aspect ratio of less than about 2 and a diameter of less than about 5 mm.

11. The method of claim 9, wherein the resulting glass substrate has a non-straight edge portion with an edge strength of greater than about 150 MPa, and the at least one non-straight edge portion is not strengthened by polishing.

12. The method of claim 9 wherein the resulting glass substrate has a non-straight edge portion with an edge strength of the at least one non-straight edge portion is greater than about 300 MPa.

13. The method of claim 9 wherein the resulting glass substrate has a non-straight edge portion with an edge strength of the at least one non-straight edge portion is greater than about 400 MPa.

14. The method of claim 9 wherein the resulting glass substrate has a hackle size is less than about 50% of the glass thickness.

15. The method of claim 9, wherein the cooling fluid is directed annularly about the laser beam toward the glass sheet.

* * * * *

UNITED STATES PATENT AND TRADEMARK OFFICE
CERTIFICATE OF CORRECTION

PATENT NO. : 10,941,070 B2
APPLICATION NO. : 15/120003
DATED : March 9, 2021
INVENTOR(S) : Andrew Stephen Altman et al.

Page 1 of 1

It is certified that error appears in the above-identified patent and that said Letters Patent is hereby corrected as shown below:

On the Title Page

Page 2, Column 2, item [56], Line 15, delete "Jaapn" and insert -- Japan --, therefor.

In the Claims

Column 14, Line 1, Claim 9, after "such that the" delete "power and/or".

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*